US010360354B1

(12) United States Patent
Easttom, II

(10) Patent No.: US 10,360,354 B1
(45) Date of Patent: Jul. 23, 2019

(54) METHOD AND APPARATUS OF PERFORMING DISTRIBUTED STEGANOGRAPHY OF A DATA MESSAGE

(71) Applicant: OPEN INVENTION NETWORK LLC, Durham, NC (US)

(72) Inventor: William Charles Easttom, II, McKinney, TX (US)

(73) Assignee: OPEN INVENTION NETWORK LLC, Durham, NC (US)

( * ) Notice: Subject to any disclaimer, the term of this patent is extended or adjusted under 35 U.S.C. 154(b) by 0 days.

(21) Appl. No.: 15/477,270

(22) Filed: Apr. 3, 2017

Related U.S. Application Data

(63) Continuation of application No. 13/951,682, filed on Jul. 26, 2013, now Pat. No. 9,619,656, which is a continuation of application No. 13/222,843, filed on Aug. 31, 2011, now Pat. No. 8,527,779.

(60) Provisional application No. 61/379,087, filed on Sep. 1, 2010.

(51) Int. Cl.
*G06F 21/16* (2013.01)
*G06F 21/62* (2013.01)
*H04L 29/06* (2006.01)
*H04L 9/32* (2006.01)

(52) U.S. Cl.
CPC .......... *G06F 21/16* (2013.01); *G06F 21/6218* (2013.01); *H04L 63/123* (2013.01); *H04L 9/3247* (2013.01)

(58) Field of Classification Search
None
See application file for complete search history.

(56) References Cited

U.S. PATENT DOCUMENTS

| 5,321,696 | A | * | 6/1994 | Buchholz | H04L 12/189 370/312 |
| 5,337,313 | A | * | 8/1994 | Buchholz et al. | 370/394 |
| 5,396,490 | A | * | 3/1995 | White et al. | 370/474 |
| 6,011,849 | A | * | 1/2000 | Orrin | 380/42 |
| 2003/0039376 | A1 | * | 2/2003 | Stach | 382/100 |
| 2003/0187798 | A1 | * | 10/2003 | McKinley et al. | 705/50 |
| 2003/0190054 | A1 | * | 10/2003 | Troyansky et al. | 382/100 |
| 2007/0104220 | A1 | * | 5/2007 | Charlebois | H04L 29/06027 370/466 |
| 2008/0107267 | A1 | * | 5/2008 | Joliot | 380/259 |
| 2012/0076346 | A1 | * | 3/2012 | Brundage et al. | 382/100 |
| 2013/0163761 | A1 | * | 6/2013 | Baras et al. | 380/270 |

(Continued)

OTHER PUBLICATIONS

Nick Feamster, Magdalena Balazinska, Greg Harfst, Hari Balakrishnan, and David Karger. 2002. Infranet: Circumventing Web Censorship and Surveillance. In Proceedings of the 11th USENIX Security Symposium, Dan Boneh (Ed.). USENIX Association, Berkeley, CA, USA, 247-262.*

(Continued)

*Primary Examiner* — Jeffery L Williams

(57) ABSTRACT

Example embodiments of the present invention may include an example method of performing steganography. The example method may include processing a data message into multiple message blocks each representing a portion of the data message, and assigning the multiple message blocks to a corresponding set of multiple data files. The method may also include storing the multiple data files in at least one memory location.

17 Claims, 8 Drawing Sheets

(56) References Cited

U.S. PATENT DOCUMENTS

2013/0195265 A1* 8/2013 Moskowitz .................... 380/28
2013/0226923 A1* 8/2013 Thing ............... G06F 17/30117
                                                           707/737

OTHER PUBLICATIONS (2002). Byte. In Encyclopedia of Software Engineering, John Wiley & Sons, 2002, J. J. Marciniak (Ed.). doi:10.1002/0471028959.sof029.*

* cited by examiner

| GENERIC EXAMPLE 502 | IMAGES ON SAME DRIVE EXAMPLE 504 | IMAGES AT DIFFERENT LOCATIONS EXAMPLE 506 |
|---|---|---|
| BLOCK SIZE | 512 BYTES | 512 BYTES |
| BLOCK POINTER SIZE | 2 BYTES | 2 BYTES |
| LOCATION OF BLOCK 1 | IMAGE1.JPG | 10.10.10.43/IMAGE1.JPG |
| LOCATION OF BLOCK 2 | IMAGE2.JPG | WWW.XYZ.COM/IMAGE2.JPG |
| LOCATION OF BLOCK 3 | IMAGE3.JPG | 10.10.15.45/IMAGE3.JPG |
| LOCATION OF BLOCK 4 | IMAGE4.JPG | FTP://10.10.1.1/IMAGE4.JPG |

METHOD AND APPARATUS OF PERFORMING DISTRIBUTED STEGANOGRAPHY OF A DATA MESSAGE

CROSS REFERENCE TO RELATED APPLICATIONS

This application is a continuation of application Ser. No. 13/951,682, entitled "METHOD AND APPARATUS OF PERFORMING DISTRIBUTED STEGANOGRAPHY OF A DATA MESSAGE", filed on Jul. 26, 2013, now issued U.S. Pat. No. 9,619,656, issued on Apr. 11, 2017, which is a continuation of application Ser. No. 13/222,843, entitled "METHOD AND APPARATUS OF PERFORMING DISTRIBUTED STEGANOGRAPHY OF A DATA MESSAGE", filed on Aug. 31, 2011, now issued U.S. Pat. No. 8,527,779, issued Sep. 3, 2013, which claims benefit to provisional application No. 61/379,087, entitled "DISTRIBUTED STEGANOGRAPHY", filed on Sep. 1, 2010, the entire contents of each are hereby incorporated by reference.

TECHNICAL FIELD OF THE INVENTION

This invention relates to a method and apparatus of implementing steganography to hide the contents of a data message among one or more data files.

BACKGROUND OF THE INVENTION

Steganography refers to any methodology used to hide a message (including text, sound, or images) in a separate file. In the realm of data networking and computer-based communications, text data or image data is inserted into another image in a hidden manner that is not recognizable to someone viewing the image. However, there are other examples where video is hidden in another video file, or sound is hidden in another sound file or even sound being hidden in a video file, etc. The image/sound/video that is used to hide the underlying message is referred to as a carrier, cover file and/or a signal.

One common steganography method used today includes using the least significant bits of an image to store data. For example, in a high resolution graphics file, each pixel is represented by 24 bits. By using the least significant (i.e. the last 1 or 2 bits) to store other data, the image is not compromised and data is hidden in the image. Specialized tools exist, including free software available on the Internet, to insert a text or image into a carrier image.

The purpose of steganography, regardless of the implementation, is to hide some underlying message so that an observer is not readily aware the message is present. This is useful in covert communications, particularly in the intelligence community. Most implementations of steganography provide ways to embed the message (e.g., text, image, video, or audio) into the carrier file. Some permutations, such as SNOW, even use blanks at the end of text files in order to hide messages. The current steganography methods in existence are unrefined and have limited capabilities.

SUMMARY OF THE INVENTION

An example embodiment may provide a method that includes processing a data message into a plurality of message blocks each representing a portion of the data message. The method may also include assigning the plurality of message blocks to a corresponding plurality of data files, and storing the plurality of data files in at least one memory location.

Another example embodiment of the present invention may include an apparatus including a processor configured to process a data message into a plurality of message blocks each representing a portion of the data message and assign the plurality of message blocks to a corresponding plurality of data files. The apparatus may also include at least one memory location configured to store the plurality of data files.

BRIEF DESCRIPTION OF THE DRAWINGS

FIG. 5 illustrates another distributed steganography key used to perform distributed steganography according to example embodiments of the present invention.

DETAILED DESCRIPTION OF THE INVENTION

Figure 1:
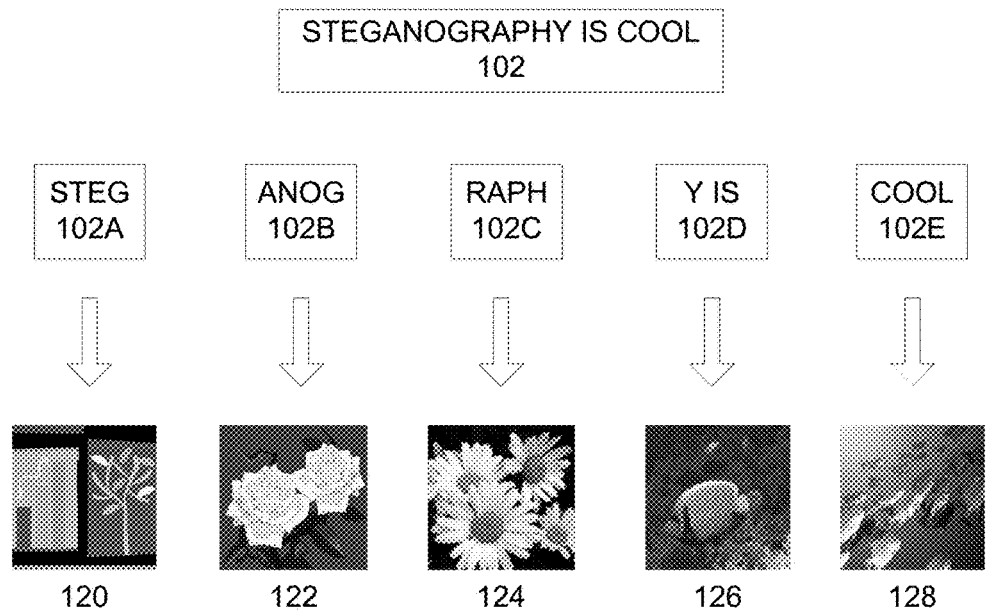
FIG. 1 illustrates an example of distributed steganography according to example embodiments of the present invention.

It will be readily understood that the components of the present invention, as generally described and illustrated in the figures herein, may be arranged and designed in a wide variety of different configurations. Thus, the following detailed description of the embodiments of a method, apparatus, and system, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment of the present invention. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" has been used in the description of embodiments of the present invention, the invention may be applied to many types of network data, such as packet, frame, datagram, etc. For purposes of this invention, the term "message" also includes packet, frame, datagram, and any equivalents thereof. Furthermore, while certain types of messages and signaling are depicted in exemplary embodiments of the invention, the invention is not limited to a certain type of message, and the invention is not limited to a certain type of signaling.

Example embodiments of the present invention describe ways to fragment a message and hide it in various carrier/cover files making the detection of the entire message extremely difficult. According to one example, the message is distributed across multiple carrier signals/sources in order to further hide the message. For instance, a single text message would be broken into blocks, and each block would be hidden in a different image file.

Other example embodiments may provide that the block size can vary and the blocks are not necessarily stored in any particular order. As a result, the first carrier file in a sequence of carrier files will not necessarily hold the first segment of the hidden message/file. Normally blocks of larger sizes such as 64-bit up to 1024-bit sized blocks are used to perform data steganography. It is also possible to store much larger block sizes, depending on the size of the carrier signal (image, video, or sound). However for example purposes a smaller block size may be used. Consider an example using 8-bit blocks to encode a message, such as "Steganography is cool" (see message 102 of FIG. 1).

FIG. 1 illustrates an example of distributed steganography according to example embodiments. Referring to FIG. 1, each character may represent 8 bits, so every 4-8 characters, or another example number of characters, represents a separate data block of the entire data message. Blank spaces are also represented by 8 bits, so according to the example illustrated in FIG. 1, the message would have 5 separate blocks 102A, 102B, 102C, 102D and 102E used to represent the entire message. The blocks may be stored in 5 different corresponding image carrier files 120, 122, 124, 126 and 128, respectively.

Creating multiple blocks for one message and using different data files or data carrier files to represent each of the blocks is part of the procedure used for implementing distributed steganography according to example embodiments. Another portion of the steganography process in general may include certain procedures for retrieving the various different data blocks to reconstruct the original data. For instance, after the data message 102 has been deconstructed, the reconstruction procedure may require locating the data file storage location(s) of each of the carrier files 120-128, downloading the carrier files and then analyzing the data contents of the carrier files to obtain the hidden data message. Such a procedure, may require knowing where the data files are located, how many total blocks must be retrieved to reconstruct the original data contents, and the order or position (sequence) that each of the blocks represents with respect to the original data file contents (i.e., is this block 2 of 4, 3 of 7, etc.).

According to example embodiments, the total blocks and block order must be known in order to correctly reconstruct certain data message contents. Each block stored in a carrier image data file (CIDF) would have an additional 2 bytes (16 bits) appended to the block or other portions of the image data contents.

Figure 2:
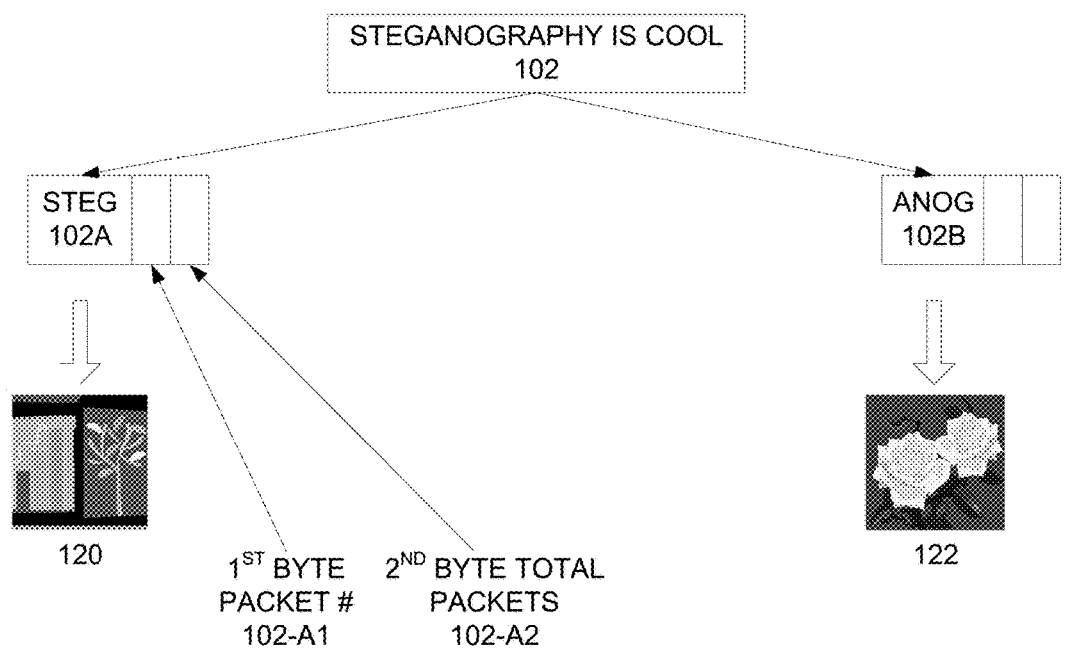
FIG. 2 illustrates a block numbering scheme used to perform distributed steganography according to example embodiments of the present invention.

FIG. 2 illustrates additional details of data block contents according to example embodiments. Referring to FIG. 2, the data block 102A includes an appended two bytes of data 102-A1 and 102-A2. The first byte 102-A1 would contain information pertaining to which block the parent block 102A represents with respect to the original message 102 (i.e., block 1 of 5), and the second byte 102-A2 would store data representing the total number of blocks the message contained (i.e. 5 blocks). Such appended data bytes would be included in the data block message information that is part of the image data file 120.

Figure 3:
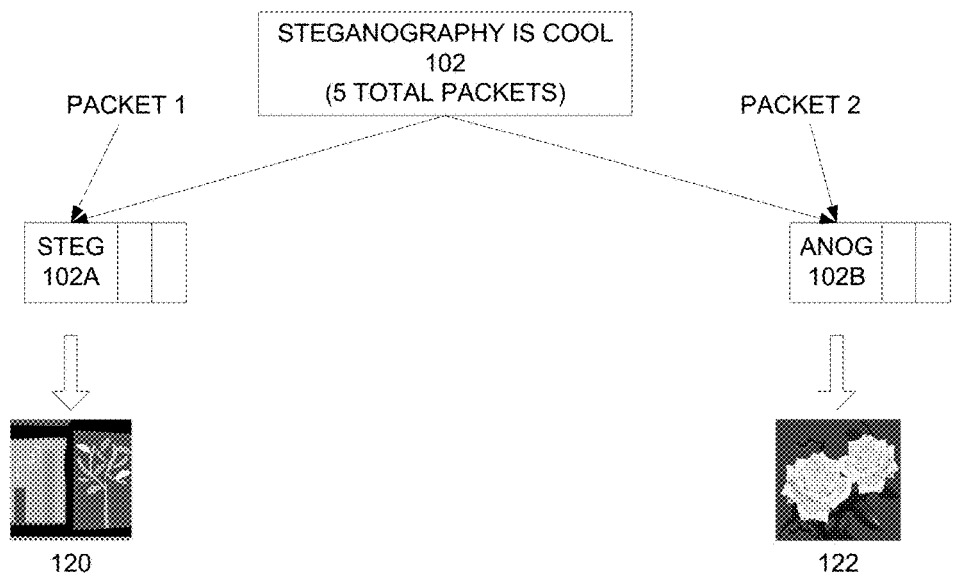
FIG. 3 illustrates another block numbering scheme used to perform distributed steganography according to example embodiments of the present invention.

FIG. 3 illustrates another example of data block processing according to example embodiments. Referring to FIG. 3, the original message 102 may be separated into 5 total data packets or 5 data blocks. Block 102A may represent packet 1 and block 102B may represent packet 2 since 8-bits can store decimal numbers between 0 and 255, this would necessitate breaking an entire message down into a number of blocks equal to or less than 255 blocks. The size of the block would be determined by the size of the original message divided by 255.

Additional bytes could be used to store the block numbering data. For example, 2 bytes (16 bits) could be used to store the value of the current block and an additional 2 bytes (16 bits) could be used to store the total number of blocks. Such a configuration would allow a message to be separated into 65,535 total blocks. Using up to 4 bytes (32 bits) for the value of the current block and 4 bytes (32 bits) for the total number of blocks would allow a message to be broken into $2^{32}$ or 4,294,967,295 blocks. This example would be appropriate for large data-sized video or audio messages that are hidden in corresponding large data-sized audio or video carrier data files. The additional bytes indicating block number(s) and total blocks may be referred to as block pointers.

The use of block numbering is similar to the procedure used to transfer TCP packets across a network. Each packet has a corresponding packet number (i.e., 'packet 2 of 10'). This same methodology may be applied to hide data blocks in diverse data image files. For example, the distributed steganography procedure may use a key to decode the data contents stored in the carrier image files similar to the keys used in encryption algorithms. However, the key may include information, such as block size and the size of the block pointer (i.e., the bytes used to indicate block numbering).

Figure 4:
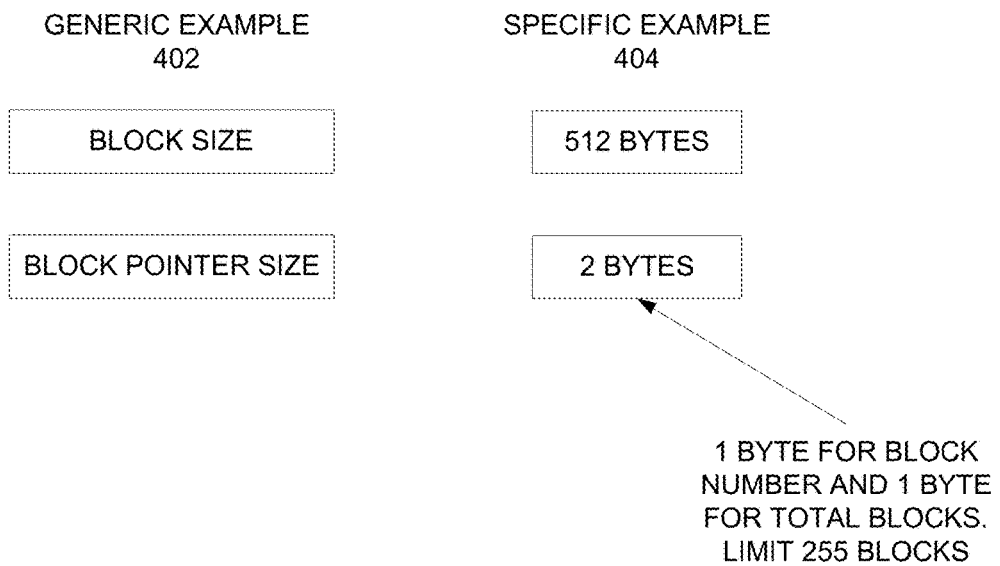
FIG. 4 illustrates a distributed steganography key used to perform distributed steganography according to example embodiments of the present invention.

FIG. 4 illustrates an example key used to decode messages using distributed steganography according to example embodiments. Referring to FIG. 4, it is important to first locate the carrier image files containing the secret data or the portion of the original message content. The file location data may be added to the key. This information could be an IP address, uniform resource locator or web address (URL), file directory, etc., which may be used to locate the carrier image file(s). The generic example 402 illustrates a block size and a block pointer size used to indicate the size of the block data. The block and the block pointer size may change to reflect the amount of data included in the original message. The specific example 404 illustrates a block size of 512 bytes and a block pointer size of 2 bytes. One byte is used to represent the block number (i.e., the block sequence number) and the other bytes are used to represent the number of total bytes. A byte may represent any number up to 255.

FIG. 5 illustrates another example of a key used to perform distributed steganography according to example embodiments. Referring to FIG. 5, if images are stored at different file storage locations and/or the image names are each different then the key would provide a way to organize and locate the plurality of image files.

Referring to FIG. 5, the generic example 502 illustrates a block size indicator, a block pointer size indicator and location data of blocks 1-4. For the example of the image files being located at a common drive location 504, the block size is 512 bytes, and the block pointer size is 2 bytes. The blocks 1-4 correspond to images 1-4, which have unique names that can be organized and located at a common drive location. In another example, the image data files may be stored at different locations in example 506. The image data files 1-4 may be stored at different locations, IP addresses, websites, ftp sites, etc. The data may be stored as live links and addresses as part of the block data embedded in the respective image files.

It is possible to store carrier image files at a variety of different locations. For example, image files may be stored on web pages, file servers, and/or FTP servers. This means the actual message could be fragmented and stored at different locations accessible over the Internet. In some examples, the carrier image files may even be stored on third party servers. The data file storage locations may be predetermined. For example, the hidden message data would generally be hidden in specific images at predetermined locations. As a result, the moderator assigned to receive those messages could simply check those images at regular intervals.

In another example embodiment, instead of embedding the message data into multiple data image files, the hidden message data could be embedded into audio or video formats. The only alteration required would be determining the location of the carrier image data files, which would instead be the location of a video or audio file (e.g., .avi, .mpeg, .mp3, .wave, etc.). The actual encoding of the message could be performed with any standard steganography technique, such as using the least significant bits LSBs (i.e., first and/or second LSBs) to store the hidden message.

According to one example, the message may be first encrypted using an encryption algorithm before hiding it using one or more of the distributed steganography procedures. Additionally, the steganography key may also be encrypted. In yet another example, a single message would be distributed in diverse media types. For instance, some blocks would be embedded into image data files (e.g., .jpg, .bmp, etc.), other blocks would be embedded into sound files (e.g., .wav, .mp3, etc.) and still other blocks could be embedded into video files (i.e., .mov, .avi, etc.). This example would not require any extension of the key, since the file name would indicate the media type. However the decoding tools would need to accommodate diverse media.

Figure 6:
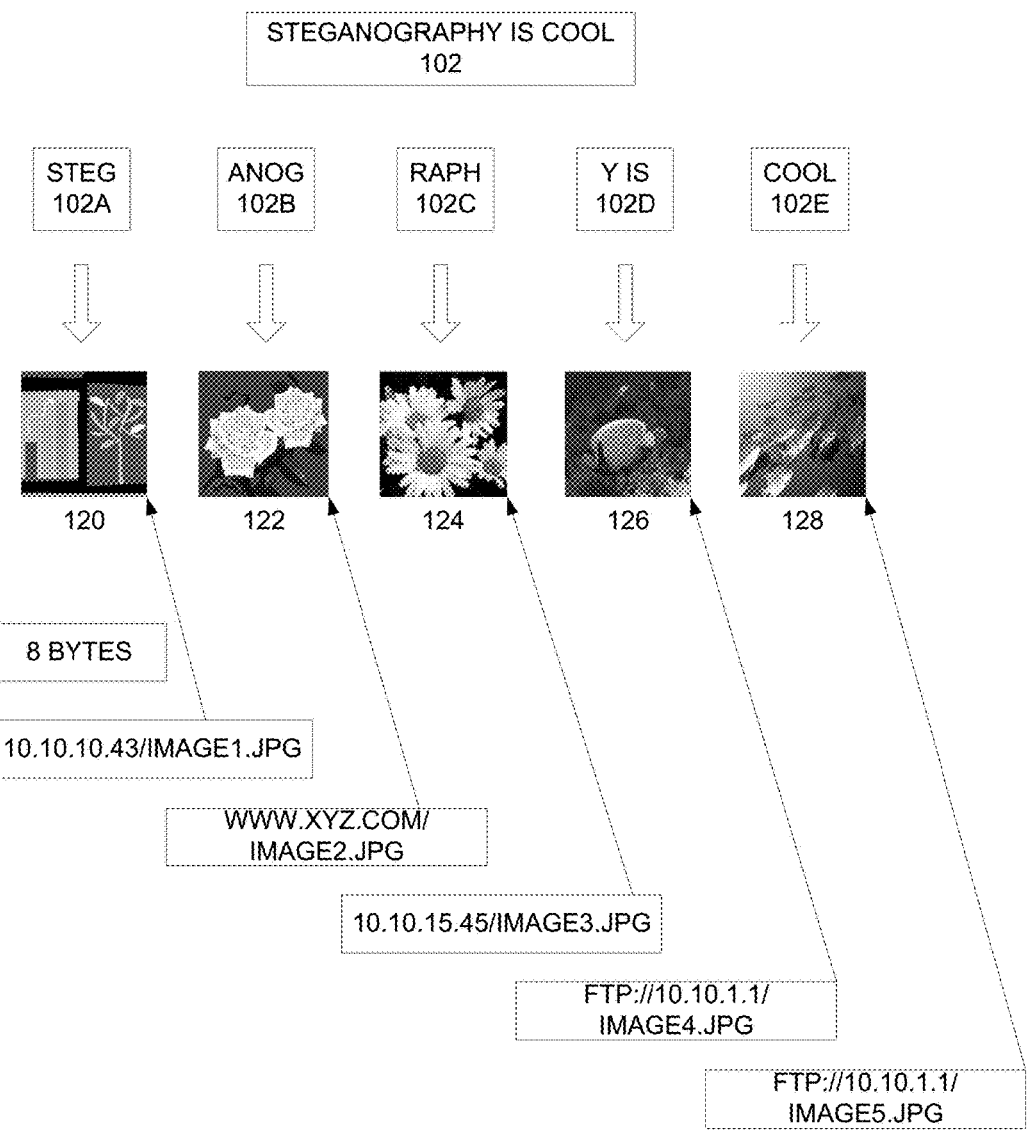
FIG. 6 illustrates yet another distributed steganography key used to perform distributed steganography according to example embodiments of the present invention.

In yet another example embodiment, each block would not contain its block number (i.e., block 2 of 10). Instead, the order of file storage sources in the key would indicate the block number without requiring an actual block number. This example is illustrated in FIG. 6. The first block is associated with a first storage location of the first image. The second image is then identified by its order in the key and so on with the remainder of the data blocks and corresponding data image files.

The previously discussed embodiments include dividing the message up in blocks similar to block symmetric encryption. The particular size of the block can be selected in any given implementation. This allows the user to divide the message up into as many or as few blocks as possible. The more blocks the message is divided into the more difficult it would be for someone to locate all the elements of the message. However, more blocks also require more carrier files, organization and processing.

Figure 7:
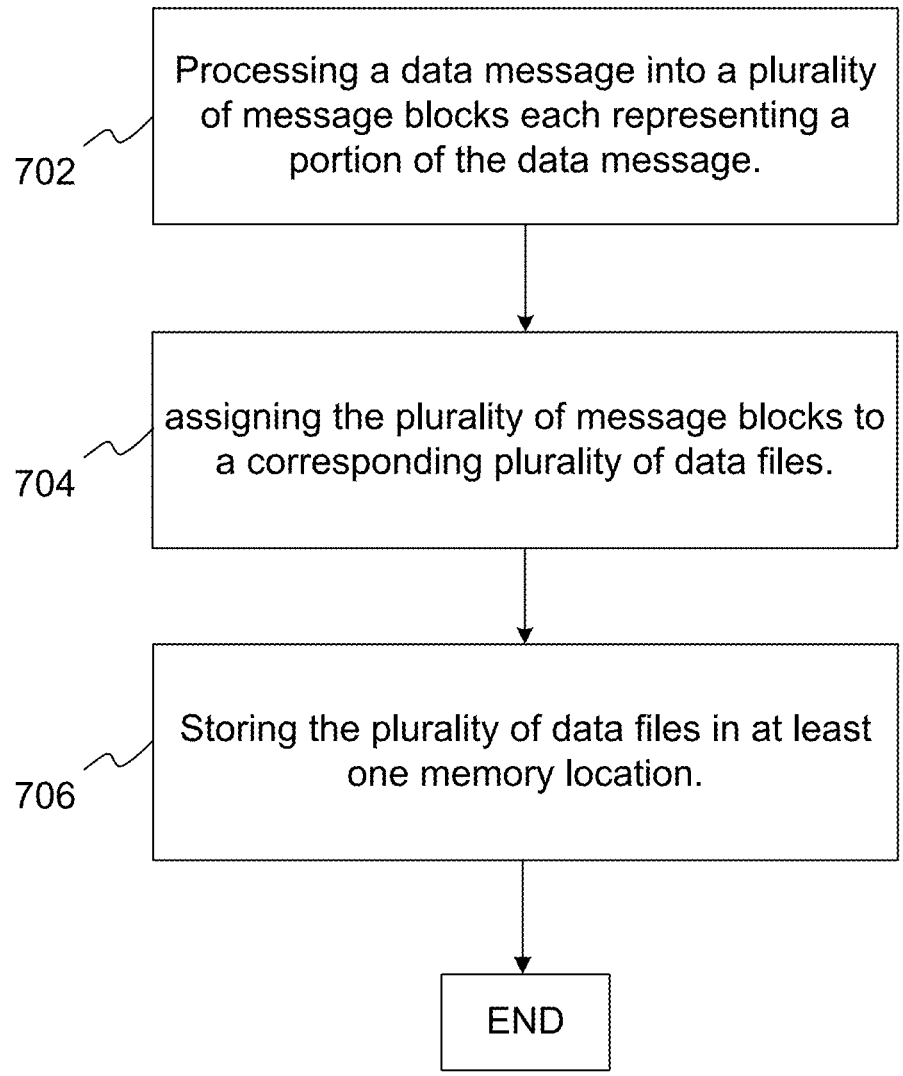
FIG. 7 illustrates a flow diagram according to example embodiments of the present invention.

FIG. 7 illustrates an example method of operation according to example embodiments. Referring to FIG. 7, the method may provide processing a data message into a plurality of message blocks each representing a portion of the data message, at operation 702. The method may also include assigning the plurality of message blocks to a corresponding plurality of data files, at operation 704. Now the message contents have been striped across multiple data files, which will be required to reconstruct the contents of the data message. The method may also include storing the plurality of data files in at least one memory location, at operation 703. The at least one memory location may include multiple different memory locations.

The plurality of data files may include any or more of image data files, text data files, video data files and audio data files. The method noted above may also include embedding the content of the plurality of message blocks into the corresponding plurality of data files. The embedded content may be hidden in the plurality of data files so that it is not viewable to users who access the data file. The memory locations may include a plurality of different memory locations including at least one of web addresses, IP addresses, file directories and file transfer protocol (ftp) site addresses.

As noted above, when the data message is processed, the data message may be separated into a plurality of message blocks, and a first byte may be appended to each of the message blocks representing a unique sequence number of the message block, the sequence number may be one of the total number of data blocks in the sequence (i.e., 1 of 9). The data block creation procedure may also include appending a second byte to each of the message blocks representing a total number of the plurality of message blocks (i.e., 9 blocks). Processing the data message into a plurality of message blocks may further include appending a file storage location to each of the message blocks identifying the at least one memory location.

According to example embodiments, determining where the various carrier/cover files are located, the order of the blocks to be retrieved and the total number of blocks to be retrieved are all parts of the steganography file retrieval and recreation/decoding procedure. Hiding messages is a commonly used communication procedure to ensure that only authorized parties are able to view the hidden message. By breaking up the message and hiding it in several, diverse locations, discovering the message becomes increasingly difficult for third parties. Example embodiments provide various options for distribution of the steganographically hidden data message/files, and in providing multiple alternative methods for locating and retrieving the various fragments/blocks that constitute the hidden message/file. Such a configuration is ideal for clandestine communications, such as those used by intelligence agencies and even undercover law enforcement agents. Messages could be spread across videos, music files, and in innocuous images stored in various places accessible privately or over the Internet until retrieved, combined and decoded to reveal the original data message.

The operations of a method or algorithm described in connection with the embodiments disclosed herein may be embodied directly in hardware, in a computer program executed by a processor, or in a combination of the two. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example FIG. 8 illustrates an example network element 800, which may represent any of the above-described network components of the other figures.

Figure 8:
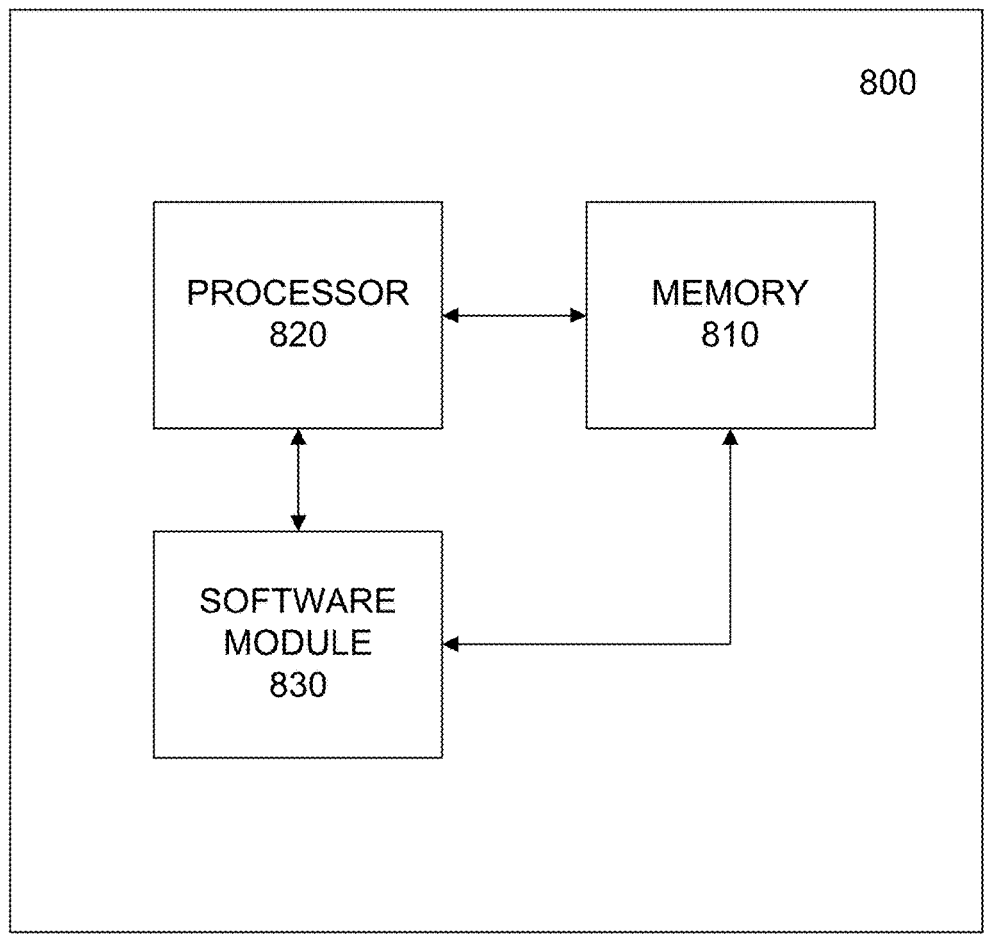
FIG. 8 illustrates a network entity that may include memory, software code and other computer processing hardware, and which may be configured to perform operations according to example embodiments of the present invention.

As illustrated in FIG. 8, a memory 810 and a processor 820 may be discrete components of the network entity 800 that are used to execute an application or set of operations. The application may be coded in software in a computer language understood by the processor 820, and stored in a computer readable medium, such as, the memory 810. Furthermore, a software module 830 may be another discrete entity that is part of the network entity 800, and which contains software instructions that may be executed by the processor 820. In addition to the above noted components of the network entity 800, the network entity 800 may also have a transmitter and receiver pair configured to receive and transmit communication signals (not shown).

While preferred embodiments of the present invention have been described, it is to be understood that the embodiments described are illustrative only and the scope of the invention is to be defined solely by the appended claims when considered with a full range of equivalents and modifications (e.g., protocols, hardware devices, software platforms etc.) thereto.

What is claimed is:

1. A method, comprising:

appending a first byte to each of a plurality of respective message blocks, each of the plurality of message blocks comprising a unique text portion of a data message comprising a text message, wherein an entirety of the plurality of message blocks collectively represents the text message, wherein each first byte identifies corresponding unique block numbers assigned to each of the message blocks among a plurality of unique block numbers assigned to the plurality of message blocks, wherein each of the plurality of unique block numbers are different from one another and indicate an order of the message blocks;

appending a second byte, to each of the plurality of message blocks, wherein each second byte identifies a total number of message blocks included in the data message, and wherein each of the plurality of second bytes are a same value;

assigning each of the plurality of message blocks to a corresponding plurality of data files; and creating a key identifying file storage location data identifying storage locations of the plurality of data files.

2. The method of claim 1, wherein each of the plurality of data files comprise at least one of image data files, text data files, video data files, and audio data files.

3. The method of claim 2, further comprising embedding the content of the plurality of message blocks into the corresponding plurality of data files.

4. The method of claim 3, wherein the embedded content is hidden in the plurality of data files.

5. The method of claim 1, wherein the plurality of data files are stored in a plurality of different memory locations comprising at least one of web addresses, IP addresses, file directories, and file transfer protocol (FTP) site addresses.

6. The method of claim 1, further comprising appending a file storage location to each of the message blocks to identify at least one memory location where the data files are stored.

7. An apparatus, comprising:

a memory; and a processor configured to:

append a first byte to each of a plurality of respective message blocks, each of the plurality of message blocks comprising a unique text portion of a data message comprising a text message, wherein an entirety of the plurality of message blocks collectively represents the text message, wherein each first byte identifies corresponding unique block numbers assigned to each of the message blocks among a plurality of unique block numbers assigned to the plurality of message blocks, wherein each of the plurality of unique block numbers are different from one another and indicate an order of the message blocks;

append a second byte, to each of the plurality of message blocks, wherein each second byte identifies a total number of message blocks included in the data message, and wherein each of the plurality of second bytes are a same value;

assign each of the plurality of different message blocks to a corresponding plurality of data files, and create a key that identifies file storage location data which identifies storage locations of the plurality of data files.

8. The apparatus of claim 7, wherein each of the plurality of data files comprise at least one of image data files, text data files, video data files, and audio data files.

9. The apparatus of claim 8, wherein the processor is further configured to embed the content of the plurality of message blocks into the corresponding plurality of data files.

10. The apparatus of claim 9, wherein the embedded content is hidden in the plurality of data files.

11. The apparatus of claim 10, wherein the plurality of data files are stored in a plurality of different memory locations comprising at least one of web addresses, IP addresses, file directories, and file transfer protocol (FTP) site addresses.

12. The apparatus of claim 7, wherein the processor is further configured to append a file storage location to each of the message blocks to identify at least one memory location where the data files are stored.

13. A non-transitory computer readable storage medium configured to store instructions that when executed cause a processor to perform:

appending a first byte to each of a plurality of respective message blocks, each of the plurality of message blocks comprising a unique text portion of a data message comprising a text message, wherein an entirety of the plurality of message blocks collectively represents the text message, wherein each first byte identifies corresponding unique block numbers assigned to each of the message blocks among a plurality of unique block numbers assigned to the plurality of message blocks, wherein each of the plurality of unique block numbers are different from one another and indicate an order of the message blocks;

appending a second byte, to each of the plurality of message blocks, wherein each second byte identifies a total number of message blocks included in the data message, and wherein each of the plurality of second bytes are a same value;

assigning each of the plurality of message blocks to a corresponding plurality of data files; and creating a key identifying file storage location data identifying storage locations of the plurality of data files.

14. The non-transitory computer readable storage medium of claim 13, wherein each of the plurality of data files comprise at least one of image data files, text data files, video data files, and audio data files.

15. The non-transitory computer readable storage medium of claim 14, wherein the processor is further configured to perform embedding the content of the plurality of message blocks into the corresponding plurality of data files.

16. The non-transitory computer readable storage medium of claim 15, wherein the embedded content is hidden in the plurality of data files.

17. The non-transitory computer readable storage medium of claim 13, wherein the plurality of data files are stored in at least one memory location which comprises a plurality of different memory locations including at least one of web addresses, IP addresses, file directories, and file transfer protocol (FTP) site addresses.

* * * * *